United States Patent
Posner et al.

(10) Patent No.: US 10,194,315 B2
(45) Date of Patent: Jan. 29, 2019

(54) SYSTEM AND METHOD FOR CIRCUMVENTING A COMMUNICATIONS PROVIDER'S GATEWAY TO ALLOW A RESELLER OF COMMUNICATIONS SERVICES TO PROVIDE ALTERNATIVE SERVICES

(71) Applicant: Tionesta, LLC, San Antonio, TX (US)

(72) Inventors: Paul Posner, San Antonio, TX (US); Jake Brown, Green Bay, WI (US)

(73) Assignee: TIONESTA, LLC, Austin, TX (US)

( * ) Notice: Subject to any disclaimer, the term of this patent is extended or adjusted under 35 U.S.C. 154(b) by 10 days.

(21) Appl. No.: 15/422,198

(22) Filed: Feb. 1, 2017

(65) Prior Publication Data
US 2017/0223526 A1    Aug. 3, 2017

Related U.S. Application Data

(60) Provisional application No. 62/289,753, filed on Feb. 1, 2016.

(51) Int. Cl.
| | |
|---|---|
| *H04W 8/28* | (2009.01) |
| *H04W 8/26* | (2009.01) |
| *H04W 88/16* | (2009.01) |
| *H04W 8/24* | (2009.01) |

(52) U.S. Cl.
CPC .............. *H04W 8/26* (2013.01); *H04W 8/245* (2013.01); *H04W 88/16* (2013.01)

(58) Field of Classification Search
CPC ...................................................... H04W 8/26
USPC ........................................................ 370/329
See application file for complete search history.

(56) References Cited

U.S. PATENT DOCUMENTS

| | | | |
|---|---|---|---|
| 6,275,470 B1 | 8/2001 | Ricciulli | |
| 7,570,944 B2 | 8/2009 | Dunlop et al. | |
| 7,769,884 B2 | 8/2010 | Acharya et al. | |
| 7,843,843 B1 | 11/2010 | Papp et al. | |
| 8,549,300 B1 * | 10/2013 | Kumar | H04L 9/3247 713/153 |
| 8,849,276 B2 | 9/2014 | Guilford et al. | |
| 9,042,389 B2 | 5/2015 | Gupta et al. | |
| 9,066,223 B2 | 6/2015 | Ralston et al. | |

(Continued)

FOREIGN PATENT DOCUMENTS

WO        2006071193 A1        7/2006

*Primary Examiner* — Samina F Choudhry
(74) *Attorney, Agent, or Firm* — Osha Liang LLP

(57) ABSTRACT

A method of circumventing a communications provider's gateway which allows a Reseller of the communications service provider's service(s) to direct voice, messaging, data, and other traffic via and to alternative networks and gateways for the purpose of reducing usage and cost of the service provider's service; directing traffic to alternative routing pathways; providing additional or supplemental services not offered by the service provider; improving speed, quality, or other performance capabilities or measures; or other reasons; control the Mobile Data Network (MDN), other type of phone number, or other user ID by use of apps, gateways, interconnection, signaling, networks, multiple SIM capability, advanced messaging servers, a "phantom" Mobile Data Network (MDN) or other user ID of the service provider, and non-standard communications pathways.

9 Claims, 8 Drawing Sheets

(56) References Cited

U.S. PATENT DOCUMENTS

2014/0128041 A1* 5/2014 Horn .................... H04W 4/003
   455/414.1
2014/0204758 A1 7/2014 Zhu et al.
2015/0215832 A1 7/2015 Fitzpatrick
2015/0373059 A1* 12/2015 Jeoung ................ H04L 65/1059
   370/259

* cited by examiner

SYSTEM AND METHOD FOR CIRCUMVENTING A COMMUNICATIONS PROVIDER'S GATEWAY TO ALLOW A RESELLER OF COMMUNICATIONS SERVICES TO PROVIDE ALTERNATIVE SERVICES

BACKGROUND OF THE INVENTION

1. Field of the Invention

The present invention is directed to a method of circumventing a telecommunications service provider's gateways and interconnection points with the public telephone and networks in order to allow a Reseller of telecommunications services to access alternative wireless networks, provide its own interconnection, control the end user telephone and/or other ID number, and in doing so avoid use, cost, and service offering limitations of the telecommunications service provider.

2. Description of Related Art

Today's telecommunications world is dominated by a small number of wireless telecommunications service providers ("Telecoms"), whose dominance provides them the ability to control pricing and limit service offerings to their direct subscribers and resellers aka mobile virtual network operators or MVNOs ("Resellers"). One method of control is to restrict end users from accessing other, competing networks. Historically, Telecoms have specified equipment provided by original equipment manufacturers ("OEMs") with restrictions built in that limit use of the device to their network alone leaving subscribers and Resellers at the mercy of Telecom network availability and quality, device and service features, and pricing. The telephone or ID number homed in the Telecom voice and messaging gateways places another measure of control in the hands of the Telecom. Through legislative action, some of these controls have been chipped away. As two examples, subscribers were granted the right to change their service contract to another Telecom and keep the same phone number ('number porting") and artificial software locks on a device that prevents its use on other Telecom networks were eliminated through "unlocking" legislation. Recent technological developments present new opportunities to loosen that control.

Most telecommunications end users buy service directly from Telecoms. However, an estimated 25% of end users in the US buy their service from mobile virtual network operators (aka MVNOs or "Resellers") who resell Telecom services and bill their subscribers directly. The government has mandated that Telecoms must resell their service to Resellers. However, they have left it to the invisible hand of competition to set pricing restrictions. After years of consolidation, just 4 Telecoms remain with 2 being dominant and having such market power that they achieve 50% gross margins while the other 2 haplessly circle the toilet bowl praying for government authorization to consolidate. In such an anti-competitive, oligopolistic telecommunications market, Telecoms have control over all aspects of service, what they make available to subscribers and Resellers, and are able to charge Resellers whatever they wish. In doing so they have control over the amount of profit a Reseller can make. In some cases Telecoms charge Resellers who have millions of subscribers more than they charge an individual customer who buys directly from them. As one result, on thin margins most wireless Resellers fail and even the largest are only marginally profitable. As another result, the few remaining small operators in rural markets who need their subscribers to be able to roam on Telecom networks pay 4-5 times what an individual Telecom subscriber pays and are squeezed out of business.

One of the primary controls that Telecoms have is the subscriber phone number. All incoming calls and messages come to the Telecom gateways (and are billable). All outgoing calls and messages display the Telecom's caller ID.

The present invention starts by taking advantage of the fact that simple, minimally functional end user devices formerly referred to as "cellular telephones" are rapidly being replaced by "smartphones". Smartphones are, in actuality, portable computers and most have the ability to access WiFi and alternative, non-Telecom networks selectively and intelligently ("Intelligent Network Selection") based upon a controllable set of rules or decisions ("Policy"). Smartphones provide the ability to move control of many service features and functions from the network to the device.

Telecoms have utilized this capability in order to reduce operations costs, reduce the need for additional expensive broadcast licenses, reduce capital outlays for associated network equipment, and even avoid roaming fees when Telecom subscribers travel and use foreign networks. With the proliferation of tens of millions of WiFi hotspots worldwide, Industry estimates indicate that approximately 80% of wireless data is now delivered to smartphones over WiFi rather than using expensive Telecom frequencies. Telecoms have kept all of the benefits of this "offloading" to themselves. Cost reductions have not been passed on to Resellers. Telecoms have no incentive to do otherwise. "Those who can, do."

The present invention provides a method that takes advantage of one additional technological development, the ability of smartphones to run programs and applications ("Apps") that replicate Telecom calling and messaging services and enables Resellers with access to alternative telecommunications gateways that are interconnected to the public telephone and messaging networks and have their own blocks of telephone numbers ("Interconnected Resellers") to circumvent (or "Bypass") Telecom networks and gateways and/or use Telecom networks in a more cost efficient manner. This results in significant cost savings and additionally provides Interconnected Resellers control of their service offering as well as the subscriber telephone number. The Telecom is reduced to being a proverbial "dumb pipe".

In the present invention, calling and messaging Apps providing equivalent services combine with Intelligent Network Selection that enables smartphones to access alternative wireless networks like free WiFi when available. For those calls that must go over the Telecom network because WiFi or other alternative networks are not available, the App utilizes VoIP over the Telecom 4G/3G data channels rather than sending a call over the Telecom "circuit-switched" channels which home in the Telecom voice gateway that bills the Reseller per minute of use. In the event that neither WiFi nor Telecom 4G/3G data channels are available, the calling and messaging App and Intelligent Network Selection together send a circuit-switched call to the Interconnected Reseller gateway which then forwards the call to the intended recipient after substituting the Interconnected Reseller's subscriber telephone number. Incoming calls and messages are homed to the Interconnected Reseller gateway so no telephone number substitution is required. The above scenario for voice calls applies also to messaging, albeit utilizing messaging gateways instead.

As one result, the Telecom number never appears. Telecoms are used as "dumb pipes", only when necessary, and at the lowest possible cost. Current studies indicate that Interconnected Resellers can cut their Telecom voice and messaging airtime costs by 70-80%.

Therefore and for many other reasons as may be known to those of ordinary skill in the art, there is a long-felt, unresolved need for better systems and methods for providing alternate wireless voice and data communication systems and services. Many other prior problems, limitations, obstacles and deficiencies (collectively, "challenges") will be generally known to those of skill in the art and will otherwise be evident from the following descriptions as well as from thoughtful consideration of any claims that may be added or appended hereto or to an application claiming priority hereto.

SUMMARY OF THE INVENTION

The present invention is directed to a method of circumventing a Telecom's gateway in order to allow a Reseller of a Telecom's services to access voice, messaging, data, and other traffic to and via alternative networks and gateways.

The method of the present invention has the further advantage of reducing usage and cost of the service provider's service by directing traffic to alternative routing pathways. In addition, the present invention allows a Reseller of communications services to provide additional or supplemental services not offered by the end user's home service provider. In addition, the present invention allows a Reseller of Telecom services to control the subscriber phone number. The present invention can improve an end user's speed, quality, or other performance capabilities or measures while using their telecommunications device.

Some aspects of the invention allow telecommunication customers to easily avoid large roaming and bandwidth charges while maintaining more of their full range of normal voice, text, and MMS services. Comparable benefits are realized with aspects of the invention that can also enable other types of data services such as Internet access service.

Embodiments of more particular aspects of the invention further have the benefit of being mostly transparent to the wireless user. In the principal preferred embodiment, an end user enables functionality of the invention by the simple step of installing an app on their phone. The installed app is preferably adapted to partially automate the registration step and to control the device's normal telecommunications services. Hence, the principal embodiment allows a user to continue using their own cellphone (or other portable communication devices) with the same phone numbers and substantially the same functionality even when using the alternative services provide via the present invention. Alternative embodiments potentially in the scope of the invention may be implemented in other modes as well, such as through alternate provisions of pre-programmed dedicated handsets for by end users.

Many other objects, features, advantages, benefits, improvements and non-obvious unique aspects of the present invention, as well as the prior problems, obstacles, limitations and challenges that are addressed, will be evident to the reader who is skilled in the art, particularly when this application is considered in light of the prior art. It is intended that such objects, features, advantages, benefits, improvements and non-obvious unique aspects are within the scope of the present invention, the scope of which is limited only by the claims of this and any related patent applications and any amendments thereto.

To the accomplishment of all the above, it should be recognized that this invention may be embodied in the form illustrated in the accompanying drawings, attention being called to the fact, however, that the drawings are illustrative only, and that changes may be made in the specifics illustrated or described. For purposes of these descriptions, it should be understood that (absent clear context otherwise) the terms "cellular phone" or "wireless device" or "wireless handset", or the like are generally considered interchangeable concepts that include, but are not limited to, mobile devices, smartphones, wireless phones, and wireless devices.

DETAILED DESCRIPTION OF PREFERRED EMBODIMENT

Figure 1:
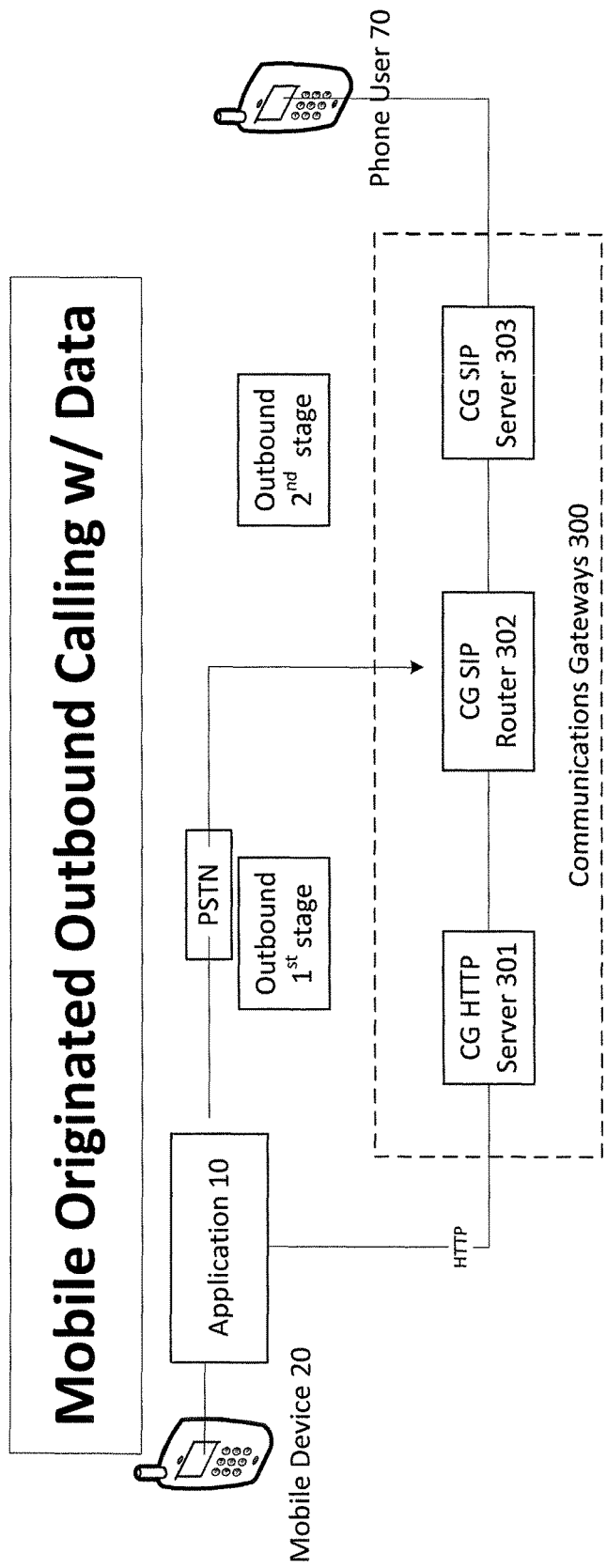
FIG. 1 is a flow diagram of basic process for making outbound calls when the end user is in a data enabled location.

As previously stated, the present invention is directed to a method of circumventing a communications provider's gateway to allow a Reseller of a communications service provider's services to direct voice, messaging, data, and other traffic via and to alternative networks and gateways for the purpose of reducing usage and cost of the service provider's service; directing traffic to alternative routing pathways; providing additional or supplemental services not offered by the service provider; improving speed, quality, or other performance capabilities or measures; or other reasons; control the Mobile Directory Number (MDN), other type of phone number, or other user ID by use of apps, gateways, interconnection, signaling, networks, multiple SIM capability, advanced messaging servers, a "phantom" Mobile Directory Number. (MDN) or other user ID of the service provider and non-standard communications pathways.

In this document the term client includes, but is not limited to customers and consumers, users, and end users. The term wireless phone includes, but is not limited to, mobile devices, smartphones, telecommunications devices, wireless phones, and wireless devices.

To better explain the method of the present invention, the following "phone numbers" will be used as defined as follows:

MDN 111.1111 is the number which belongs to the Reseller and is issued to the user of the Application 10.

It is a "phantom" number that neither the user nor anyone he communicates with ever sees.

MDN 222.2222 reaches the Voice Gateway Servers which are part of the Communications Gateways 300 of the Reseller using the method of the present invention.

Note the Voice Gateway Servers consist of those servers that handle voice functions within the Communications Gateways 300. The Voice Gateway Servers are strictly used for voice. All routing information first needs to be sent to the Voice Gateway Servers via data or via SMS gateways. Said routing information is then relayed to the Voice Gateway Servers which modifies the destination and source routing information accordingly.

MDN 333.3333 as a number which belongs to home service provider and is the user's normal phone number.

MDN 444.4444 is the phone number of a different mobile device.

Common to all the processes of the invention is an Application 10 installed on an end user's Mobile Device 20 that is programed to intelligently choose a wireless or other network path using decision rules based on cost, speed of throughput, signal level, or other performance capabilities or measures, or other reasons. The Application 10 chooses an air interface and signals other network elements (such as gateways) in order to direct traffic properly and without any intervention of the user other than to initially activate the application.

The Communications Gateways 300 performs the same functions as the end user's normal Service Provider Gateways 40 (such as voice switch/gateway, SMS, MMS, or alternative messaging gateways). The Communications Gateways 300 that may direct traffic point-to-point to other devices via the Application 10, to Service Provider Gateways 40, to the Phone User 70, and to Alternate Service Providers Gateways, to the PSTN (public switched telephone network), or to the Internet. The Communications Gateways 300 consists of those servers required to accomplish the communications, routing, and other aspects of the invention. In some embodiments of the invention, the Communications Gateways 300 has the ability to detect multiple networks, evaluate and track the individual network performance, and will route the call over the best route. In some embodiments the Communications Gateways 300 will split the call over multiple networks to ensure the best call quality.

The Reseller provides its own Communications Gateways 300. Once activated, the Application 10 redirects all communications to the Communications Gateways 300. The user's normal cellular network is only used as path to get to the Communications Gateways 300. The Communications Gateways 300 consists of Session Initiation Protocol (SIP) servers, Signaling System 7 (SS7) servers, and other signaling servers designed to perform its various functions. The Communications Gateways 300 provides the Application 10 with service provider identifying MDN, other phone number, or other userID which becomes a "phantom" number that neither the subscriber nor anyone he communicates with ever sees, but which is used to accomplish the provision of services to the user by the Communications Gateways 300 servers.

The Reseller has direct interconnection to the PSTN, Internet, inter-carrier SMS/MMS hubs, and other messaging hubs. The Communications Gateways 300 is set up to perform substitute, alternate, and/or supplemental functions to those of Service Provider Gateways 40 by co-opting their functions and redirecting them via the various direct interconnections of the Reseller. The Communications Gateways 300 are capable of "spoofing" the callerID of the user, other phone number, or other identifying user ID thereby ensuring that from the perspective of the user or whomever the user calls all the identifying information is the same as if the user was using their home service provider.

The Communications Gateways 300 are capable of using multiple SIM through either multiple SIM slots that are controllable, dual/multiple SIM capability on a single SIM card, a soft SIM, or otherwise which may be controlled by the Application 10, a mobile device, a network element, or other controller.

Mobile Originated Outbound Calling

Turning to FIG. 1, which depicts the process for a user of the invention to originate an outbound call while the user has a data connection. In this embodiment, a data connection can refer to any method of receiving data, including WiFi connections as well as cellular data connections such as 3g, 4g, LTE or other cellular data connection methods as is known in the art. Furthermore, in the figures the term "CG" refers to the Communications Gateways 300 servers and the abbreviation "CG" is used to identify various specific sub-servers.

Returning to FIG. 1, the user dials the outbound number. The Application 10 intercepts the dialed number and initiates a connection to the CG Sip Router 302 via the phone's stock dialer. In FIG. 1, this is done through a Hypertext Transfer Protocol (HTTP) connection. The CG HTTP Server 301 forwards the appropriate routing information received from the Application 10 to the CG SIP Router 302. Session Initiation Protocol (SIP) is a communications protocol for signaling and controlling multimedia communication sessions. The most common applications of SIP are in Internet telephony for voice and video calls, as well as instant messaging, over Internet Protocol (IP) networks. An example of the HTTP delivered information is provided as follows: "http://IPADDRESS:PORT/getROUTE. php?caller_id_number=1XXXXXXXXXX&CARRIER_ID=1&destination=1XXXXXXXXXX&cellular_number1XXXXXXXXXX". The CG SIP Router 302 starts a SIP call via the CG SIP Server 303 using the provided formatted routing information. The CG SIP Server 303 completes the call to the Phone User 70.

Figure 2:
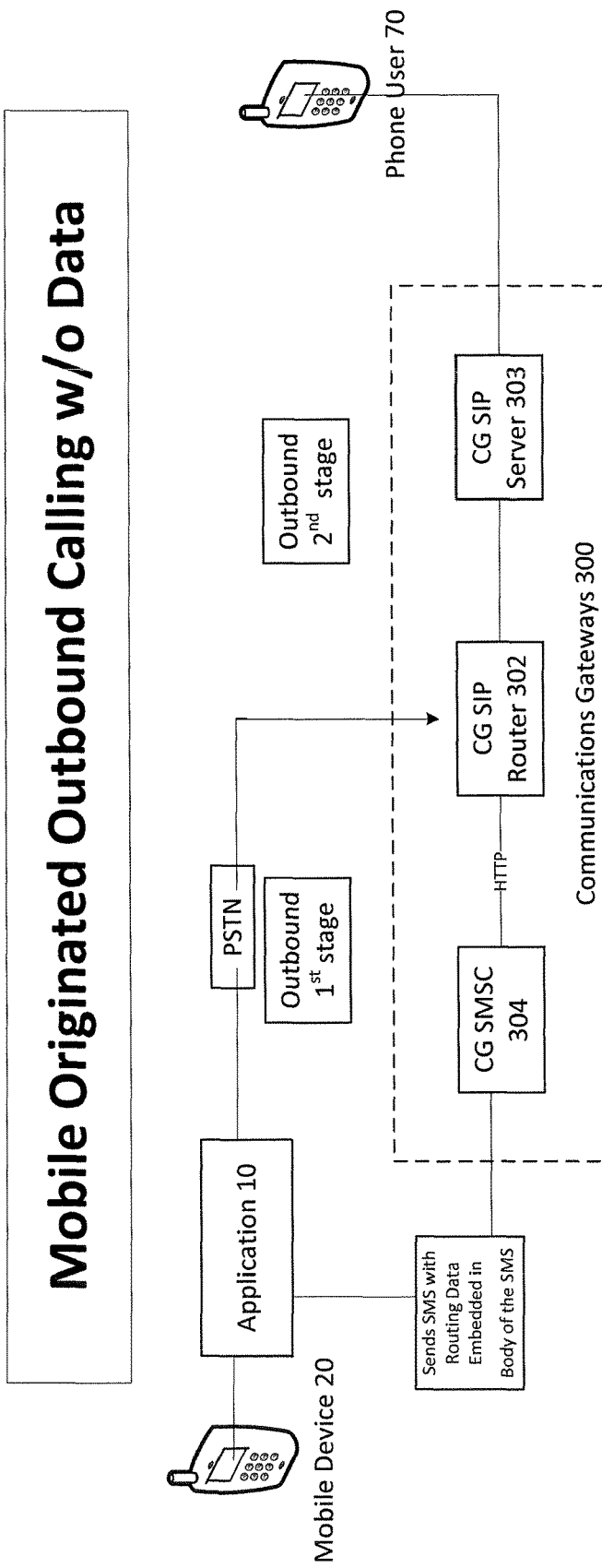
FIG. 2 is a flow diagram of basic process for making outbound calls when the end user is not in a data enabled location.

With reference to FIG. 2, this depicts the process for a user of the invention to originate an outbound call when the user does not have a data connection. The user of Mobile Device 20 dials the outbound number. The Application 10 intercepts the dialed number and sends an SMS with the routing data embedded into the body of the SMS to the CG SMSC 304. The Application 10 initiates a connection to the CG SIP Router 302 via the stock dialer. The Short Message Service Center (SMSC) is a network element in the Communications Gateways 300 whose purpose is to store, forward, convert and deliver SMS messages. The CG SMSC 304 receives the SMS, parses the routing information, and forwards the routing information to the to the CG SIP Router 302 via HTTP. An example of the HTTP delivered information is provided as follows: "http://IPADDRESS:PORT/getROUTE. php?caller_id_number=1XXXXXXXXXX&CARRIER_ID=1&destination=1XXXXXXXXXX&cellular_number1XXXXXXXXXX". The CG SIP Router 302 starts a SIP call via the CG SIP Server 303. The CG SIP Server 303 completes the call to the Phone User 70.

What follows is an alternative explanation of the process for user initiated outbound calling of the invention. A user with the number normal home service number of 333.3333, but with the Reseller provided phantom number of 111.1111 wants to call another user with the number 444.4444. The user dials 444.4444 on their device. The Application 10 previously installed on the device, dials 222.2222 without the user's intervention. The 222.2222 number reaches the Communications Gateways 300 at the Reseller. The Application 10 sends signaling information that includes the 111.1111 and 444.4444 information. If signaling information is not able to be transmitted by the Application 10, the Application 10 will silently dial the 444.4444 number when the Communications Gateways 300 servers prompts the Application 10 for the user dialed number. With that information the Communications Gateways 300 located at 222.2222 redirects the call to 444.4444 through two steps. First, between 111.1111 to 222.2222 via one of the following methods:

1) Via Voice over Internet Protocol (VoIP) over WiFi, completely bypassing the Service Provider Gateways 40 and billing.
2) If WiFi isn't available, via VoIP over 3G/4G data, reducing the Service Provider Gateways 40 cost for that call.
3) If neither WiFi nor 3G/4G data are available, via a "cellular fallback" over Service Provider Gateways 40 cellular voice network with no cost reduction.

Second, via 222.2222 and 444.4444, the Communications Gateways 300 located at 222.2222 recognizes the 111.1111 number and redirects the call via the PSTN to 444.4444 after substituting the user's callerID 333.3333. The recipient at 444.4444 receives incoming call with callerID 333.3333.

Mobile Terminated Inbound Calling

Figure 3:
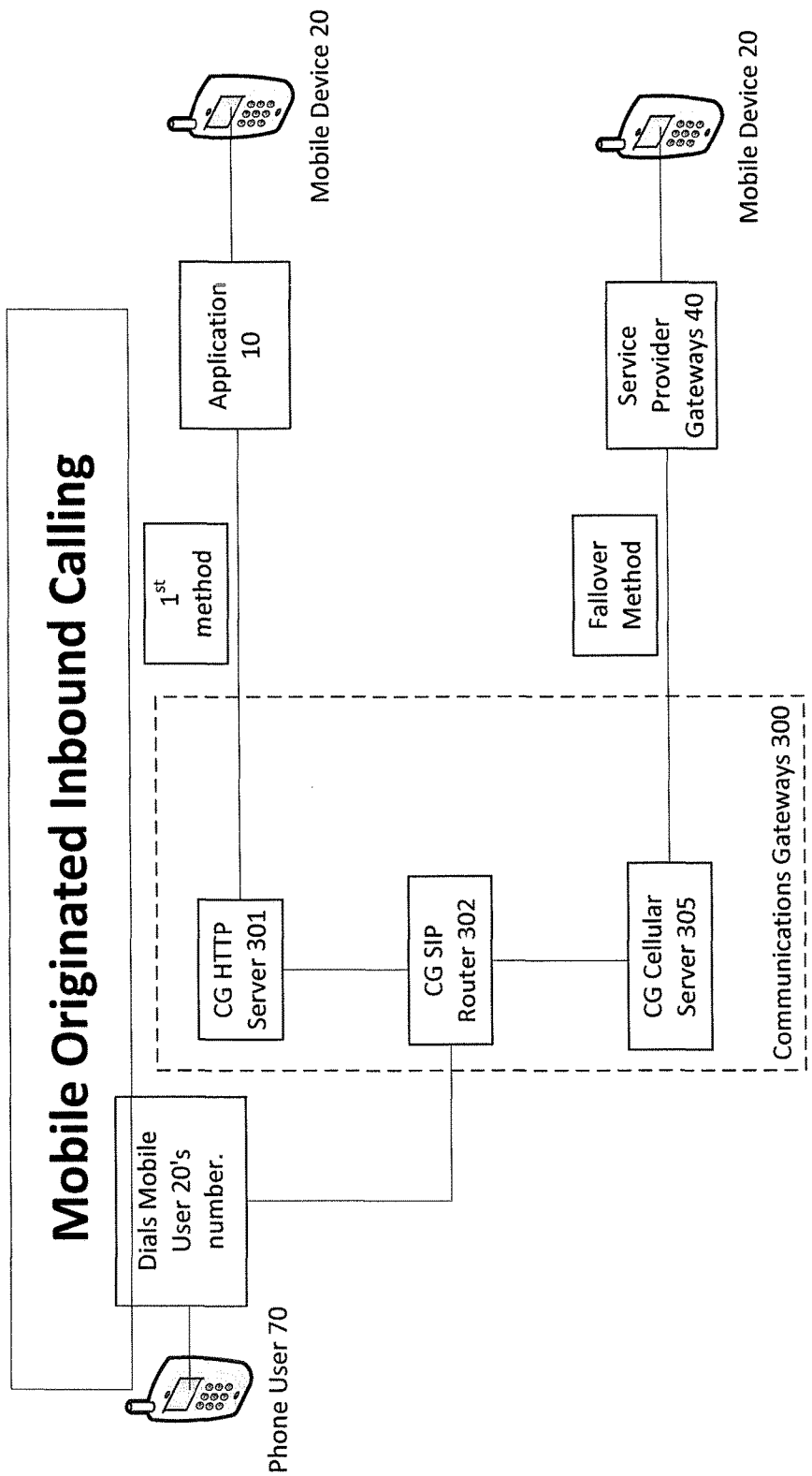
FIG. 3 is a flow diagram of basic process for receiving inbound calls.

FIG. 3 is a depiction of the process of receiving an inbound call. The Phone User 70 dials the number of the Mobile User 20. The CG SIP Router 302 determines if the Mobile User 20 is able to receive VoIP calls. If so the CG HTTP Server 301 communicates with the Application 10 the appropriate VoIP routing information and initiates the VoIP call. If the Mobile User 20 is not able to receive VoIP calls, the CG Cellular Server 305, as a fall over method, routes the call via the Service Provider Gateways 40.

What follows is an alternate description of the process for inbound calling to a user. A user with the number 444.4444 wants to call another user with the number 333.3333. The user 333.3333 has a Reseller provided phantom number of 111.1111. The Communications Gateways 300 receives the call from 444.4444 and connects to 333.3333 by choosing the best path to deliver the call:

1) Via VoIP over WiFi, completely bypassing the Service Provider Gateways 40 and billing.
2) If WiFi isn't available, via VoIP over 3G/4G data, reducing the Service Provider Gateways 40 cost for that call.
3) If neither WiFi nor 3G/4G data are available, via a PSTN by dialing 111.1111.

Mobile Originated Outbound Messaging

Figure 4:
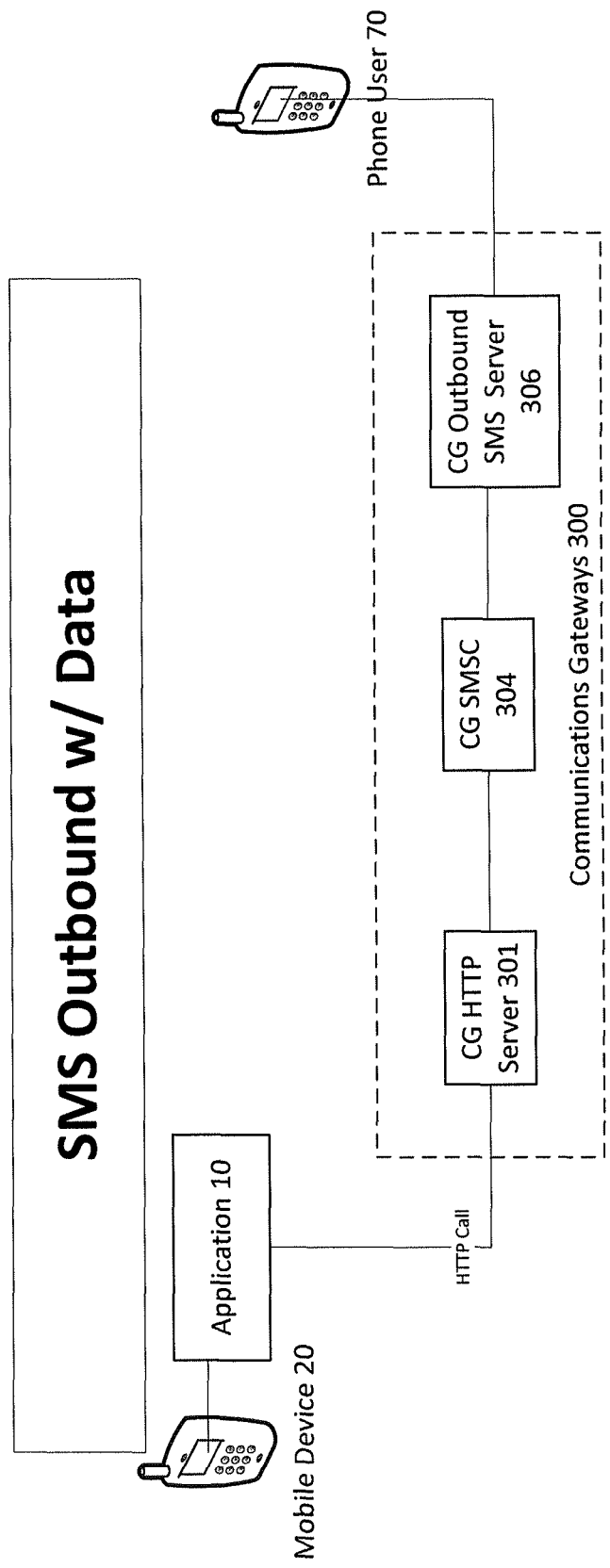
FIG. 4 is a flow diagram of basic process for sending outbound Short Message Service (SMS) texts when the end user is in a data enabled location.

FIG. 4 describes the outbound process for sending SMS texts when the user has a data connection. The Mobile Device 20 prepares a SMS text as normal. The Application 10 intercepts the text and sends it and the appropriate routing data to the CG HTTP Server 301. The CG HTTP Server 301 forwards it to the CG SMSC 304 server which formats the outbound SMS and sends it to the Phone User 70 via the CG SMS-IG 306 (Intercarrier Gateway). An example of the HTTP formatted routing request is as follows: https://api.I-PADDRESSOFCGSMSC.net/smsc?usemame=uname&password=passwd&origination=1XXXXXXXXXX&destination=1XXXXXXXXXX&message=XXXXXXXXX.

Figure 5:
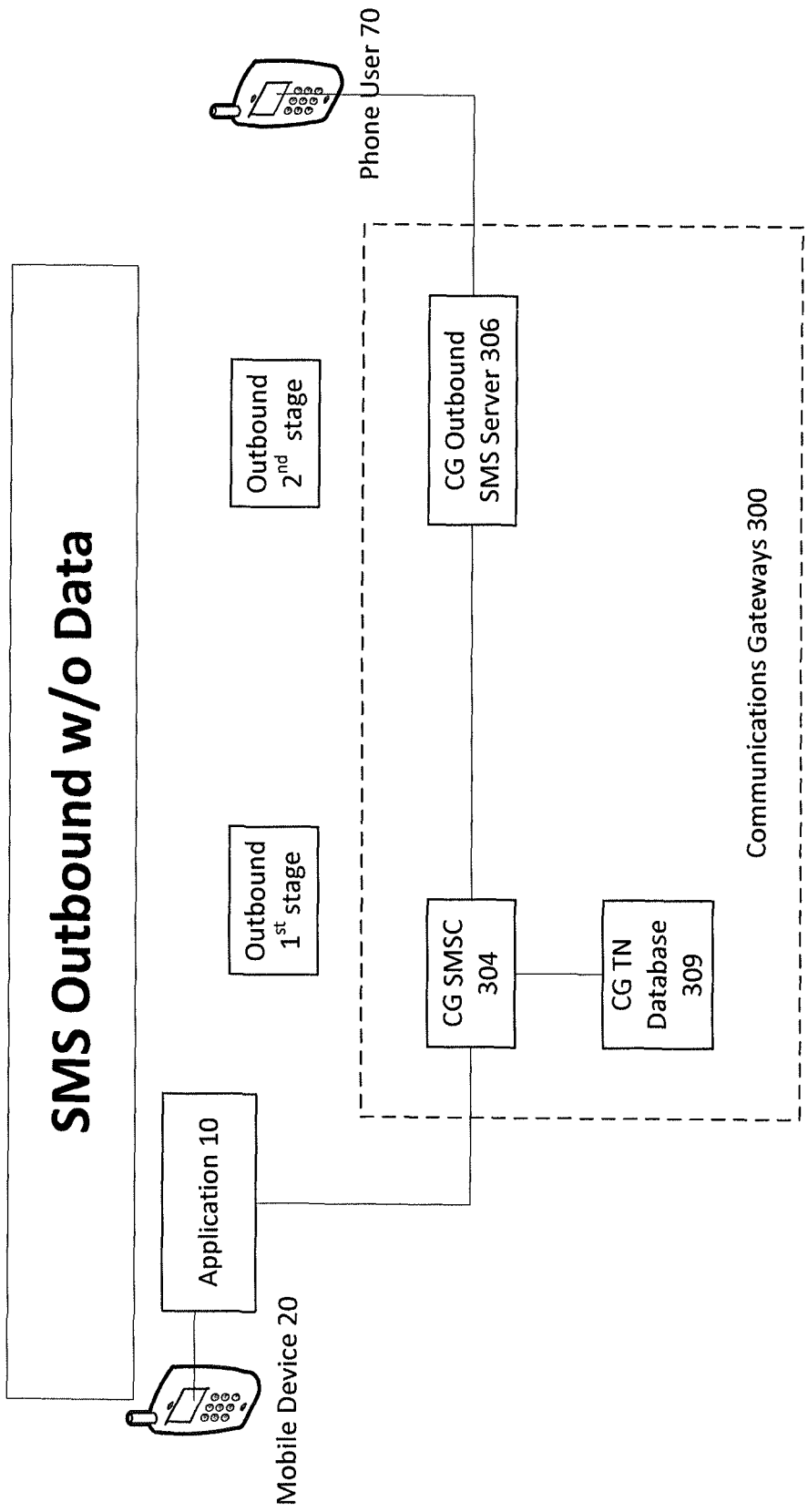
FIG. 5 is a flow diagram of basic process for sending outbound SMS texts when the end user is not in a data enabled location.

FIG. 5 describes the outbound process for sending SMS texts when the user does not have a data connection. The Mobile Device 20 prepares a SMS text and sends it and the appropriate routing data to the CG SMSC 304 server 301 with the destination number in the body of the text. The CG SMSC 304 server formats the outbound SMS and sends it to the Phone User 70 via the CG SMS-IG 306. If necessary the CG SMSC looks up the routing information using the CG TN Database 309 (Telephone Number).

What follows is an alternate description of the process for sending a message to a user. A user with the number 333.3333 wants to text or message another user with the number 444.4444. First, the Application 10 delivers the message to the Communications Gateways 300 by the best path possible:

1) Via WiFi.
2) If WiFi isn't available, via VoIP over 3G/4G data.
3) If neither WiFi nor 3G/4G data are available, via the Service Provider Gateways 40 after inserting 444.4444 as leading characters in the message content.

Second, the Communications Gateways 300 delivers the message to 444.4444 via an intercarrier SMS hub after proper conversion to SMS. The Communications Gateways 300 will also send MMS messages and convert messages to MMS when appropriate.

Mobile Terminated Inbound SMS Messaging

Figure 6:
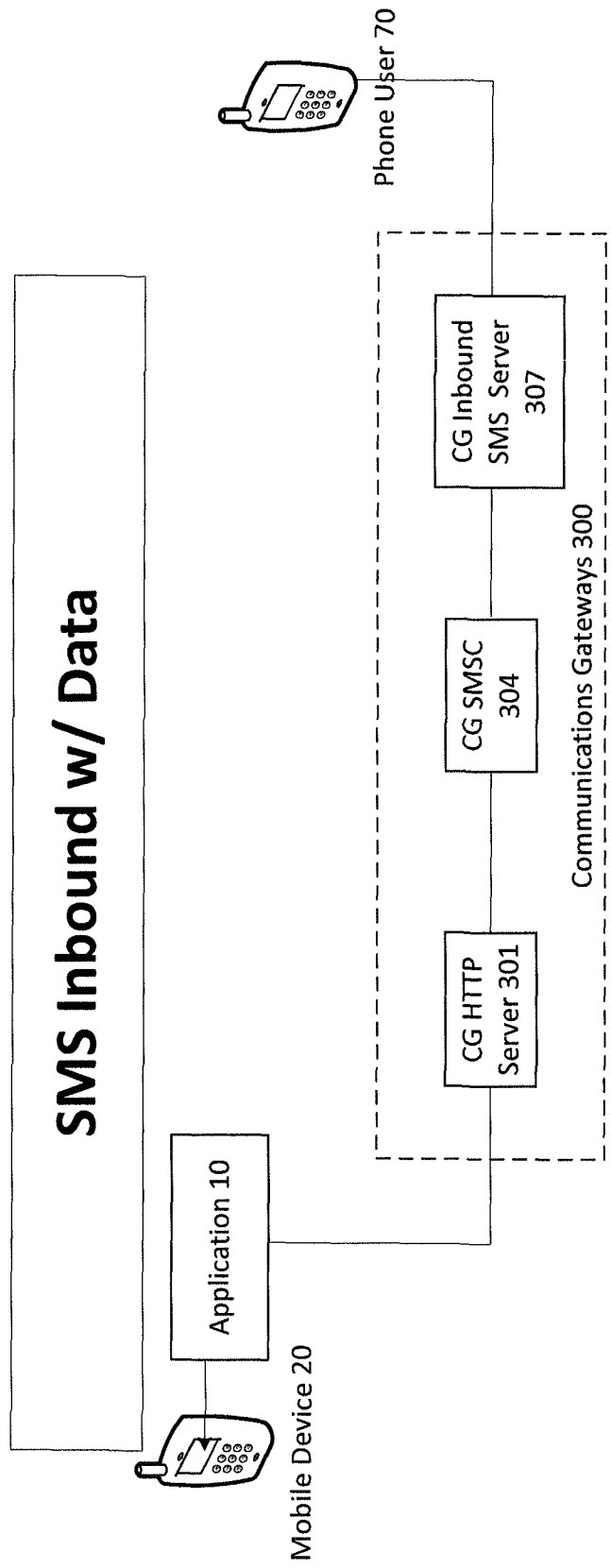
FIG. 6 is a flow diagram of basic process for receiving inbound SMS texts when the end user is in a data enabled location.

FIG. 6 describes the inbound process for receiving SMS texts when the user has a data connection. The Phone User 70 prepares a SMS text as normal. The text is routed to the CG Inbound SMS Server 307 to the CG SCMC 304. The CG SCMC formats it appropriately and sends it to the CG HTTP 301 which forwards the message to the Application 10. SMS inbound messages without data is not supported in some embodiments.

Figure 7:
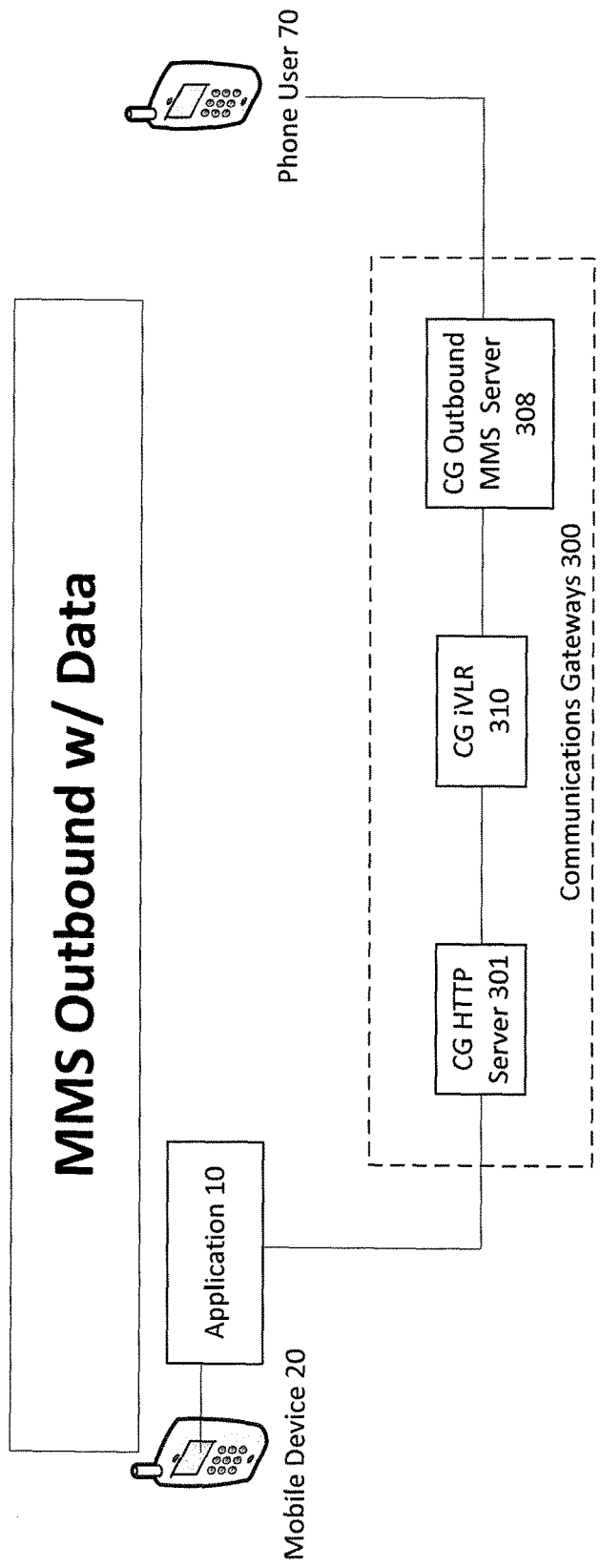
FIG. 7 is a flow diagram of basic process for sending outbound Multimedia Messaging Service (MMS) texts when the end user is in a data enabled location.

What follows is an alternate description of the process for receiving a message from a user. A user with the number 444.4444 wants to text or message another user with the number 333.3333. The Reseller's short message service center (SMSC) (which can be part of the Communications Gateways 30) receives and redirects the message and chooses the best path to 111.1111; it may be via 333.3333 however the server hides 333.3333 number from the user; the 333.3333 number is a dumb conduit:

1) Via WiFi, after conversion to Internet Protocol (IP) format.
2) If WiFi isn't available, via 3G/4G data, after conversion to IP format Mobile Originated Outbound MMS Messaging FIG. 7 describes the outbound process for sending MMS texts when the user has a data connection. The Mobile Device 20 prepares a MMS text as normal. The Application 10 intercepts the text and sends it and the appropriate routing data to the CG HTTP Server 301. The CG HTTP Server 301 forwards it to the CG iVLR 310 (Intelligent Visitor Location Register) server which formats the outbound SMS and sends it to the Phone User 70 via the CG Outbound MMS Server 308. MMS Outbound messages are stored by the Communications Gateways 300 until data is restored and delivery is resumed.

Mobile Terminated Inbound MMS Messaging

Figure 8:
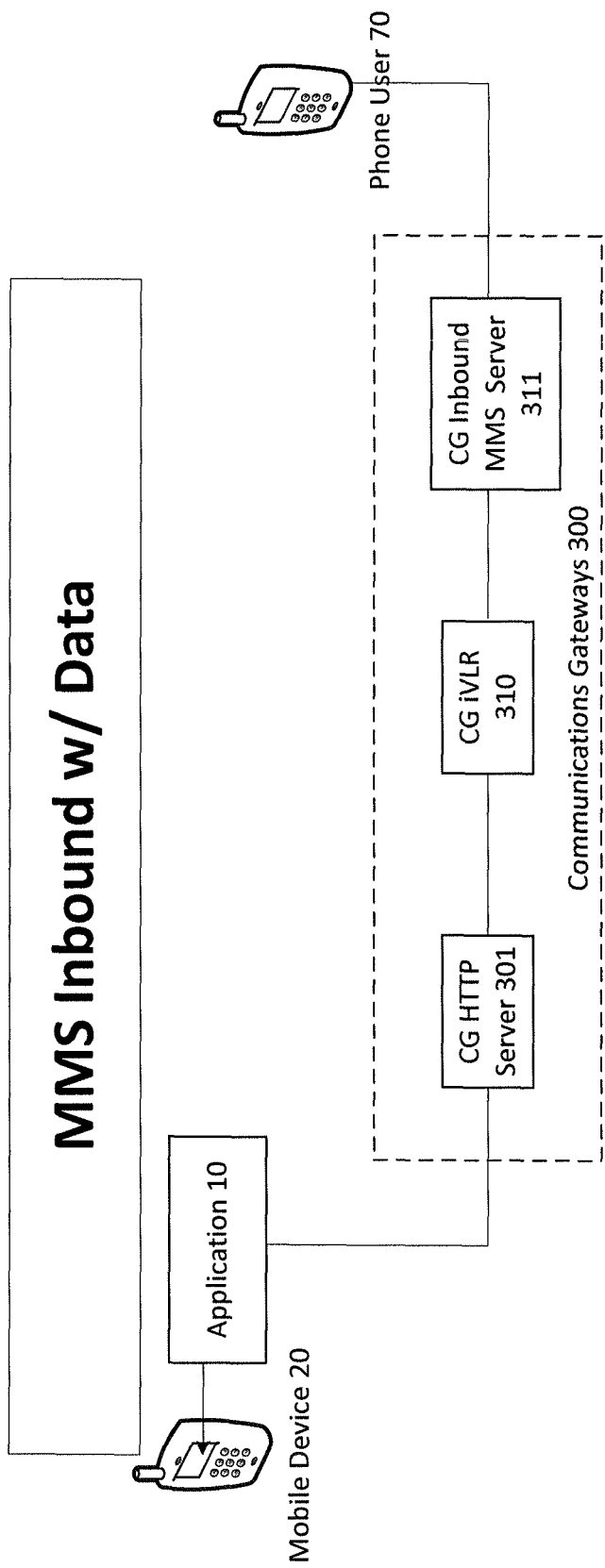
FIG. 8 is a flow diagram of basic process for sending outbound MMS texts when the end user is in a data enabled location.

FIG. 8 describes the inbound process for receiving MMS texts when the user has a data connection. The Phone User 70 prepares a MMS text as normal. The text is routed to the CG Inbound MMS Server 311 to the CG iVLR 310. The CG iVLR 310 formats it appropriately and sends it to the CG HTTP 301 which forwards the message to the Application 10. MMS inbound messages are stored by the Communications Gateways 300 until data is restored and delivery is resumed.

The present invention therefore allows users of the invention to use their normal phone and phone number to receive personal electronic communication messages while avoiding exorbitant roaming and/or access charges. While the preferred embodiments have been described with certain features, many alternative embodiments will have more features than described herein, and many other alternatives will have fewer features and/or alternative features as will be understood to those of skill in the art. For instance, although certain preferred embodiments are focused on providing personal electronic communications, other embodiments may only provide one such form of communication, and still other embodiments may also provide other features such as data connectivity (i.e., Internet web service) and/or any number of other known handset features and/or services that can be enabled on or in conjunction with wireless handsets.

In some alternate embodiments, the particular embodiments may operate based on any available VoIP protocol depending on particular needs and functionality preferences. Certain preferred alternative embodiments include using Session Initiation Protocol (SIP) phones, while other alternatives are also envisioned with h.2302, GSM phones, CDMA phones, LTE phones, public switched telephone network (PSTN) phones, or other wired, wireless, or wireless communications networks. It should be understood that the graphical representation of the system is an exemplary reference to any number of software systems that may be implemented by the present invention.

In some embodiments of the present invention, the method and systems described are provided via computer software, either via the internet, via a stand-alone software application operating independently or in connection with other software systems, or some combination of the two. As well, embodiments may come in any known form and may also be implemented by hardware, software, scripting languages, firmware, middleware, microcode, hardware description languages, and/or any combination thereof.

When implemented with coded programming, it should also be understood that the program code or code segments to perform the necessary steps or tasks of alternative embodiments may be coded in solid state or may be stored in a machine-readable medium such as a computer storage medium. A code segment or machine-executable step or instruction may represent a procedure, a function, a subprogram, a program, a routine, a subroutine, a module, a software package, a script, a class, or any combination of instructions, data structures, and/or program statements. Executable code segments may also be coupled to other code segments or to a hardware circuit by passing and/or receiving information, data, arguments, parameters, and/or memory contents, which may be passed, forwarded, or transmitted via any suitable means including memory sharing, message passing, token passing, network transmission, etc.

Specific details are given in the above description to provide a thorough understanding of various preferred embodiments. However, it is understood that these and other embodiments may be practiced without these specific details. For example, processes may be shown in block diagrams in order not to obscure the embodiments in unnecessary detail. In other instances, well-known processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have many additional steps not included in the figure. A process may correspond to a method, a function, a procedure, a subroutine, a subprogram, etc. When a process corresponds to a function, its termination corresponds to a return of the function to the calling function or the main function.

Embodiments of the invention may involve use middleware and/or other software implementation; the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may be downloadable through an internet connection service. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

Although less preferred, some alternative embodiments of the invention may not be fully enabled to complete outbound calls on licensed cellular networks. Such alternative embodiments are referred to as "License-Disabled" to differentiate from other embodiments, because they fulfill most if not all the other functional and other characteristics as are described above, except that they are functionally unable to consummate an outbound call on a licensed cellular network. Hence, any outbound cellular call that may be initiated by an end user with such a License-Disabled embodiment would be dropped prior to (or rather than) being connected with a licensed cellular network. It is contemplated nonetheless that such a License-Disabled embodiment could be modified after being put in use in order to add the omitted functionality, either through securing and enabling rights to transmit on licensed cellular networks, or through removing or changing the state of a component that causes the embodiment not have full functionality.

While the principles of the disclosure have been described above in connection with specific apparatuses and methods, it is to be clearly understood that this description is made only by way of example and not as limitation on the scope of the disclosure. Whether now known or later discovered, there are countless other alternatives, variations and modifications of the many features of the various described and illustrated embodiments, both in the process and in the system characteristics, that will be evident to those of skill in the art after careful and discerning review of the foregoing descriptions, particularly if they are also able to review all of the various systems and methods that have been tried in the public domain or otherwise described in the prior art. All such alternatives, variations and modifications are contemplated to fall within the scope of the present invention.

We claim:

1. A method for circumventing a home communications provider's gateway, said method comprising:
    installing an application on a mobile device, the application being programmed to control and choose which communications path the mobile device uses;
    providing a communications gateway, the communications gateway comprising servers and devices required for communication using a plurality of methods including, point to point, cellular, internet, and wired telephone communications;
    intercepting, by the application, an outbound number dialed by a user of the mobile device to communicate with a receiver mobile device;
    sending, by the application to the communications gateway, routing information associated with the dialed outbound number; and
        redirecting, by the communications gateway based on the routing information, communication from the mobile device to circumvent the home communications provider's gateway,
    wherein the routing information is sent to a Session Initiation Protocol (SIP) router of the communications gateway via a Hypertext Transfer Protocol (HTTP) connection available to the mobile device or sent to a Short Message Service Center (SMSC) of the communications gateway via Short Message Service (SMS) if the HTTP connection is not available to the mobile device, the SMSC being configured to forward the routing information contained in the SMS to the SIP Router;
    wherein the communications gateway provides the application with an unique identification number wherein the unique identification number is hidden from the user and anyone that the user communicates with but that is recognizable by the communications gateway and used by the communications gateway to accomplish the provision of services to the user,
    wherein the communications gateway spoofs any identification information of the user so that from the perspective of the user or anyone the user communicates with all the identification information appears as if the user was using their home communications provider, and
    wherein a reseller of communication services is able to circumvent the home communications provider's gateways to provide alternative communication services.

2. The method of claim 1 wherein the application chooses which communications path to use based on cost, speed of the communication method, and signal level.

3. The method of claim 1 wherein the application chooses which communications path to use without any intervention of the user other than to initially activate the application.

4. The method of claim 2 wherein the application chooses which communications path to use without any intervention of the user other than to initially activate the application.

5. The method of claim 1 wherein the communications gateway detects, evaluates, and tracks the individual network performance of each communication method and routes the communications over the best route.

6. The method of claim 1 wherein the communications gateway splits the communication over multiple methods to ensure the best communications quality.

7. The method of claim 5 wherein the communications gateway splits the communication over multiple methods to ensure the best communications quality.

8. The method of claim 1 wherein the application and communications gateway controls and uses multiple subscriber identification modules hardware or software for the provision of services to the user.

9. A system for circumventing a home communications provider's gateway, said system comprising:
    an application installed on a mobile device the application being programmed to control and choose which communications path the mobile device uses;
        intercept an outbound number dialed by a user of the mobile device to communicate with a receiver mobile device; and
        send, to a communications gateway, routing information associated with the dialed outbound number;
    the communications gateway comprising servers and devices required for communication using a plurality of methods including, point to point, cellular, internet, and wired telephone communications;
    the communications gateway configured to
        send, to the communications gateway, routing information associated with the dialed outbound number;
        redirect, based on the routing information, communication from the mobile device to circumvent the home communications provider's gateway, wherein the routing information is sent to a Session Initiation Protocol (SIP) router of the communications gateway via a Hypertext Transfer Protocol (HTTP) connection available to the mobile device or sent to a Short Message Service Center (SMSC) of the communications gateway via Short Message Service (SMS) if the HTTP connection is not available to the mobile device, the SMSC being configured to forward the routing information contained in the SMS to the SIP Router;

provide the application with an unique identification number wherein the unique identification number is hidden from a user and anyone that the user communicates with but that is recognizable by the communications gateway and used by the communications gateway to accomplish the provision of services to the user; and spoof any identification information of the user so that from the perspective of the user or anyone the user communicates with all the identification information appears as if the user was using their home communications provider; and wherein a reseller of communication services is able to circumvent the home communications provider's gateways to provide alternative communication services.

* * * * *